(12) United States Patent
Harada et al.

(10) Patent No.: US 8,107,117 B2
(45) Date of Patent: Jan. 31, 2012

(54) INFORMATION PROCESSING DEVICE, INFORMATION COLLECTION DEVICE, INFORMATION COLLECTION SYSTEM, AND METHOD FOR MANAGEMENT OF INFORMATION RELATED FUNCTIONS

(75) Inventors: Masahiko Harada, Ebina (JP); Shinji Ota, Ebina (JP); Toru Hada, Ebina (JP); Kohei Tanaka, Ebina (JP); Goro Noda, Ebina (JP); Atsushi Takeshita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1142 days.

(21) Appl. No.: 11/907,606

(22) Filed: Oct. 15, 2007

(65) Prior Publication Data

US 2008/0165386 A1 Jul. 10, 2008

(30) Foreign Application Priority Data

Jan. 9, 2007 (JP) .................................. 2007-001434

(51) Int. Cl.
*G06K 15/00* (2006.01)
*G06F 3/12* (2006.01)

(52) U.S. Cl. ...................... 358/1.16; 358/1.13; 358/1.15; 399/81; 399/82; 715/733; 715/735

(58) Field of Classification Search ........ 358/1.13–1.16; 715/707, 713, 744, 745, 762, 763, 810, 811–867, 715/733, 735; 399/81, 82; 719/327
See application file for complete search history.

(56) References Cited

U.S. PATENT DOCUMENTS

| | | | | |
|---|---|---|---|---|
| 5,717,439 A * | 2/1998 | Levine et al. | ................. | 715/835 |
| 7,052,192 B2 * | 5/2006 | Uchida | ........................... | 400/76 |
| 7,505,164 B2 * | 3/2009 | Uchida | ....................... | 358/1.15 |
| 7,619,762 B2 * | 11/2009 | Chavers et al. | ............... | 358/1.15 |
| 7,800,769 B2 * | 9/2010 | Kobayashi et al. | .......... | 358/1.13 |
| 7,903,272 B2 * | 3/2011 | Kato | ............................. | 358/1.15 |
| 7,933,033 B2 * | 4/2011 | Ohishi et al. | .................. | 358/1.15 |
| 2003/0137682 A1 * | 7/2003 | Sakai et al. | .................. | 358/1.13 |
| 2004/0212829 A1 * | 10/2004 | Uchida | ........................ | 358/1.15 |
| 2005/0027825 A1 * | 2/2005 | Hikawa et al. | ............... | 709/219 |
| 2005/0157321 A1 * | 7/2005 | Alacar | ......................... | 358/1.13 |
| 2006/0146368 A1 * | 7/2006 | Uchida | ........................ | 358/1.15 |
| 2007/0252857 A1 * | 11/2007 | Watase | ............................. | 347/5 |

FOREIGN PATENT DOCUMENTS

| | | |
|---|---|---|
| JP | A-05-127854 | 5/1993 |
| JP | A-08-110735 | 4/1996 |

* cited by examiner

*Primary Examiner* — Twyler Haskins
*Assistant Examiner* — Dennis Dicker
(74) *Attorney, Agent, or Firm* — Oliff & Berridge, PLC

(57) ABSTRACT

An information processing device includes: a memory that stores function identifiers assigned to functions built into the information processing device, and function identifiers assigned to functions not built into the information processing device; a display controller that causes a display unit to display the function identifiers stored in the memory; a manipulation unit that accepts manipulation for specifying one of the function identifiers displayed by the display controller; and a transmission unit that transmits, if the one of the function identifiers which has been specified by the manipulation is assigned to one of the functions not built into the information processing device, the specified one of the information identifiers or an information item indicating one of the functions to which is assigned one of the information identifiers which has been specified by the manipulation, to a predetermined device.

13 Claims, 5 Drawing Sheets

| FUNCTION NAME | RECEPTION COUNT |
|---|---|
| 16-UP OUTPUT OR MORE | 99 |
| MAKE TEETH WHITER | 56 |
| REMOVE WRINKLES FROM SKIN | 8 |
| ... | ... |

INFORMATION PROCESSING DEVICE, INFORMATION COLLECTION DEVICE, INFORMATION COLLECTION SYSTEM, AND METHOD FOR MANAGEMENT OF INFORMATION RELATED FUNCTIONS

CROSS-REFERENCE TO RELATED APPLICATIONS

This application claims priority under 35 USC 119 from Japanese patent document 2007-001434, the disclosure of which is incorporated by reference herein.

BACKGROUND

1. Technical Field

The present invention relates to an information processing device, information collection device, information collection system, and method.

2. Related Art

Information processing devices such as printers and copiers are equipped with various functions.

SUMMARY

To know what functions are desired by users is a key to developing information processing devices described above and software related to those devices. The invention has been made in view of the above circumstances and provides comprehending functions which users desire for information processing devices.

According to the invention described in claim 1 of the present invention, there is provided an information processing device including: a storage unit that stores function identifiers assigned to functions which are built into the information processing device, and function identifiers assigned to functions that are not built into the information processing device; a display controller that causes a display unit to display the function identifiers stored in the storage unit; a manipulation unit that accepts manipulation for specifying one of the function identifiers displayed by the display controller; and a transmission unit that transmits, if one of the function identifiers which has been specified by the manipulation is assigned to one of the functions which is not built-into the information processing device, the specified one of the information identifiers or an information item indicating one of the functions to which is assigned the one of the information identifier which has been specified by the manipulation, to a predetermined device.

BRIEF DESCRIPTION OF THE DRAWINGS

The invention will be described with reference to the accompanying drawings, wherein like numbers reference like elements:

FIG. 10 is a sequence chart showing operation of distributing a software program 27a.

DETAILED DESCRIPTION

An exemplary embodiment will now be described referring to an example in which an image forming device such as a printer or a copier is used as an information processing device capable of performing various functions by executing various processing.

1. Structure 1-1. System Structure

Figure 1:
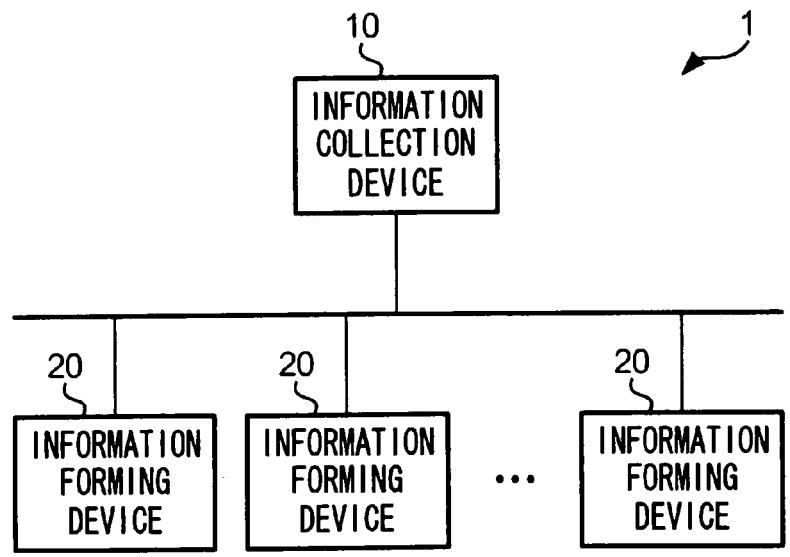
FIG. 1 is a block diagram showing an entire structure of an information collection system 1.

FIG. 1 is a block diagram showing a whole structure of an information collection system 1 according to the embodiment. In the information collection system 1, an information collection device 10 and plural image forming devices 20 are connected to each other via a network.

1-2. Structure of Image Forming Device 20

Figure 2:
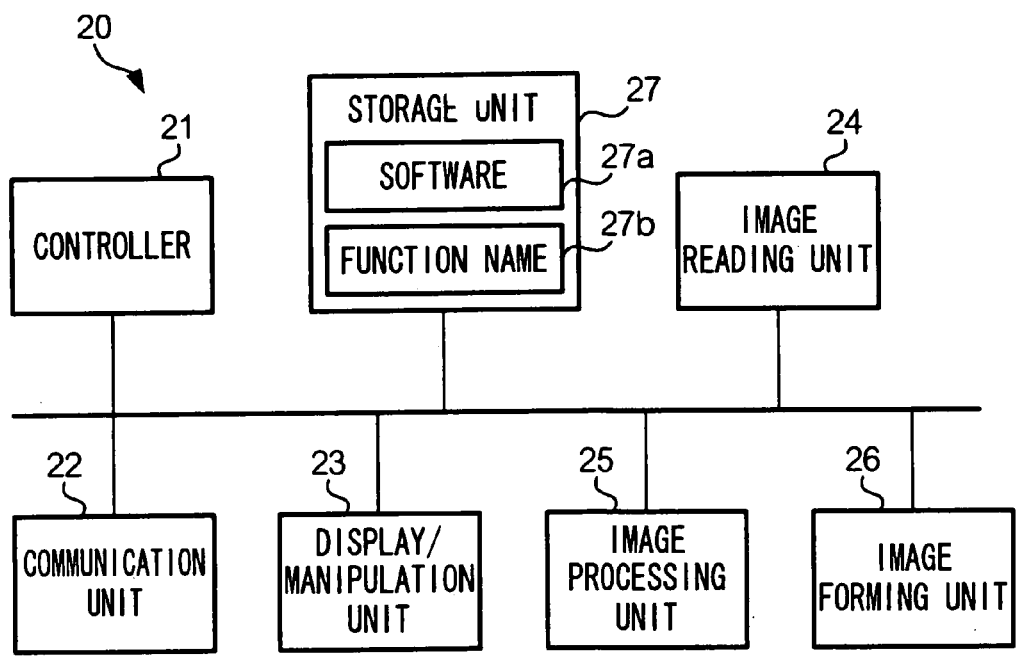
FIG. 2 is a block diagram showing a structure of an image forming device 20.

FIG. 2 is a block diagram showing a structure of the image forming device 20. As shown in the figure, the image forming device 20 includes a controller 21, a communication unit 22, a display/manipulation unit 23, an image reading unit 24, an image processing unit 25, an image forming unit 26, and a storage unit 27. The controller 24 includes, for example, a CPU (Central Processing Unit), a ROM (Read Only Memory) and a RAM (Random Access Memory), and controls respective parts of the image forming device 20. The ROM stores a basic control program executed by the CPU. The communication unit 22 transmits/receives data to/from the information collection device 10 connected via a network. The display/manipulation unit 23 has, for example, a touch panel display and various manipulation buttons. The display/manipulation unit 23 displays various images based on image data supplied from the controller 21, and accepts manipulations made by users.

The image reading unit 24 is a so-called scanner, which optically reads an image from a paper sheet (e.g., an original document) and generates read image data expressing the read image. The image processing unit 25 includes image processing circuits such as plural ASICs (Application Specific Integrated Circuits) and LSI (Large Scale Integration) circuits, and an image memory for temporarily storing image data. The image processing circuits execute various image processings on input image data. The image forming unit 26 irradiates a laser beam on image carriers such as photosensitive members, to form latent images in accordance with the image data. The latent images are respectively developed with toners of colors Y (yellow), M (magenta), C (cyan), and K (black), to attain toner images. The toner images of these colors are transferred to a paper sheet, layered one on the other on the paper sheet, by an intermediate transfer member such as an intermediate transfer belt.

Figure 3:
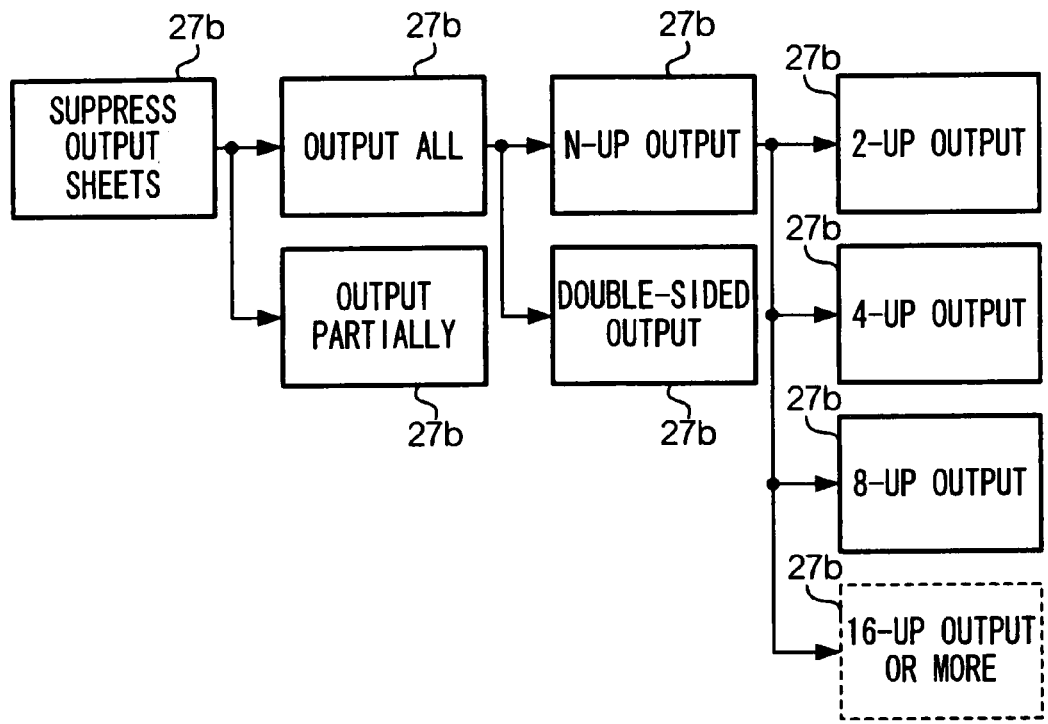
FIG. 3 schematically shows an example of function names 27b which are hierarchically related to each other.
Figure 4:
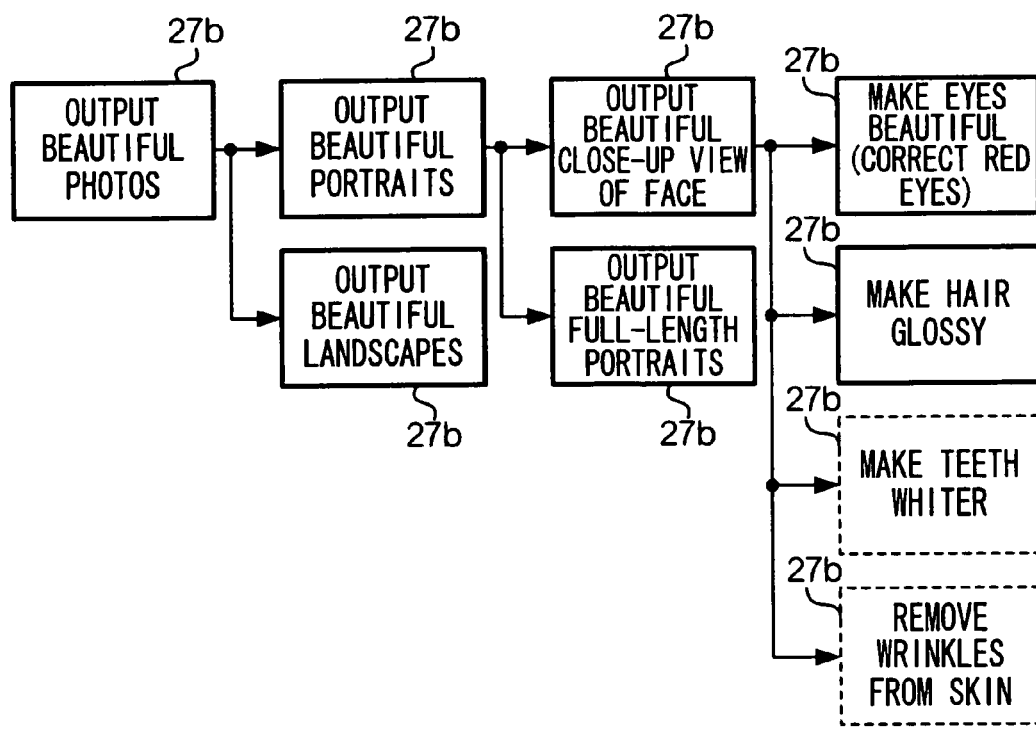
FIG. 4 also schematically shows an example of function names 27b which are hierarchically related to each other.

The storage unit 27 is a large-capacity storage device such as a HDD (Hard Disk Drive). The storage unit 27 stores plural function names 27b (function identifiers as identification information) in addition to software programs 27a describing processing procedures for performing the functions. The plural function names 27b are hierarchically related to each other. For example, function names 27b classified in the uppermost layer of a hierarchy of function names are regarded as "parents". Function names 27b regarded as "children" are subordinate to the "parents". Further, function names 27b regarded as "grandchildren" are subordinate to the function names 27b regarded as "children". FIGS. 3 and 4 schematically show examples of such hierarchically related function names 27b. In FIG. 3, a function name 27b "suppress output sheets" belongs to the uppermost layer regarded as "parents", is shown in relation to children function names 27b "output all" and "output partially" which are subordinate to the function name 27b "suppress output sheets" in the uppermost layer. Further, grandchildren function names 27b "n-up output" and "double-sided output" are subordinate to the children function name 27b "output all". Furthermore, great-grandchildren function names 27b "2-up output", "4-up output", "8-up output", and "16-output or more" are subordinate to the grandchildren function name 27b "n-up". In this embodiment, a hierarchical layer to which the great-grandchildren function names 27b belongs is the lowermost layer.

The function names 27b stored in the storage unit 27 include function names 27b of different types mixed with each other. Function names of one type are assigned to functions built into the image forming device 20, and those of the other type are assigned to functions not built into the image forming device 20. For example, in FIG. 3, "2-up output", "4-up output", and "8-up output" surrounded by solid lines are function names 27b assigned to functions which are actually built into the image forming device 20. On the other side, "16-up output" surrounded by a broken line is a function name 27b assigned to a function which is not built into the image forming device 20. To distinguish function names 27b of such different types, each function name 27b is given a flag. For example, a flag "0" is set for function names 27b assigned to functions built into the device, while a flag "1" is set for function names 27b assigned to functions not built into the information processing device. These flag values are stored in the storage unit 27, each related to a corresponding function name 27b.

1-3. Structure of Information Collection Device 10

Figures 5, 6:
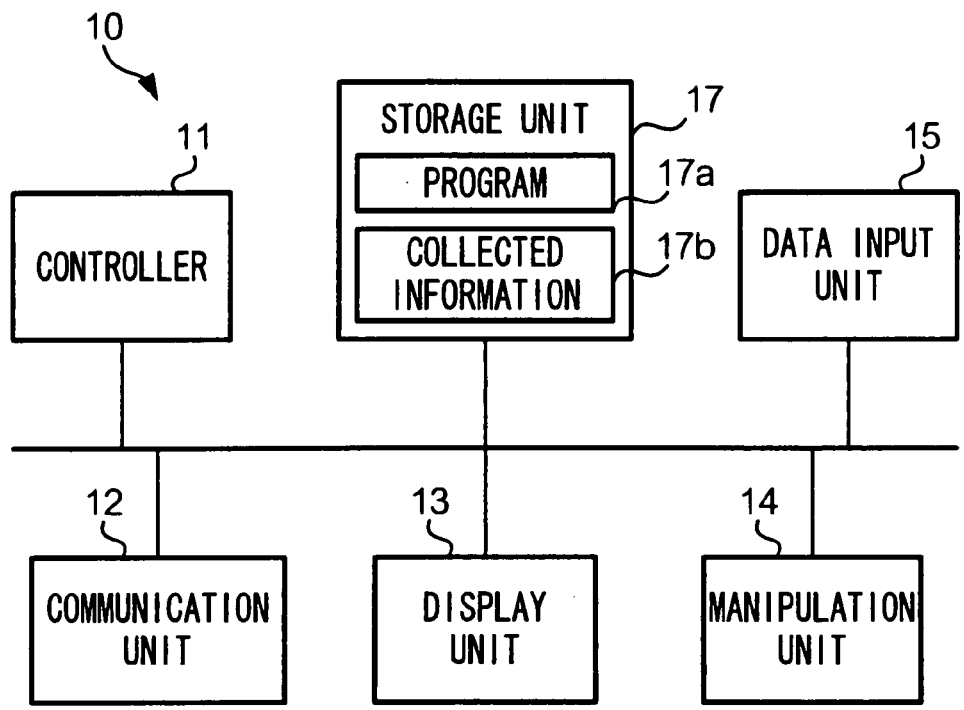
FIG. 5 is a block diagram showing a structure of the information collection device 10.
FIG. 6 shows an example of collection information 17b.

FIG. 5 is a block diagram showing a structure of the information collection device 10. As shown in the figure, the information collection device 10 includes a controller 11, a communication unit 12, a display unit 13, a manipulation unit 14, a data input unit 15, and a storage unit 17. The controller 11 includes, for example, a CPU, a ROM, and a RAM, and controls respective parts of the information collection device 10. The ROM stores a basic control program executed by the CPU. The communication unit 12 transmits/receives data to/from each of the image forming devices 20 connected via a network. The display unit 13 has, for example, a liquid crystal display, and displays various images based on imaged data supplied from the controller 11. An operator who manipulates the manipulation unit 14 is, for example, a developer of the image forming device 20. The data input unit 15 receives a software program 27a which is sent from a software storage device not shown or the like via a network or a communication line. The storage unit 17 is a large-capacity storage device such as a HDD, and stores collected information 17b in addition to a program 17a. FIG. 6 shows an example of the collected information 17b. The collected information 17b includes function names 27b and reception counts, related to each other. The function names 27b are function names of the type assigned to functions not built into the image forming devices 20. The reception times each indicate a value expressing the number of times a corresponding function name has been received from (or specified by) the image forming devices 20. FIG. 6 shows an example in which a function name 27b "16-up output or more" has been received "99" times, a function name 27b "make teeth whiter" has been received "56" times, as well as a function name 27b "remove wrinkles from skin" has been received "8" times.

2. Operation 2-1. Operation of Information Forming Device 20

Next, an operation of the embodiment will be described.

Figure 7:
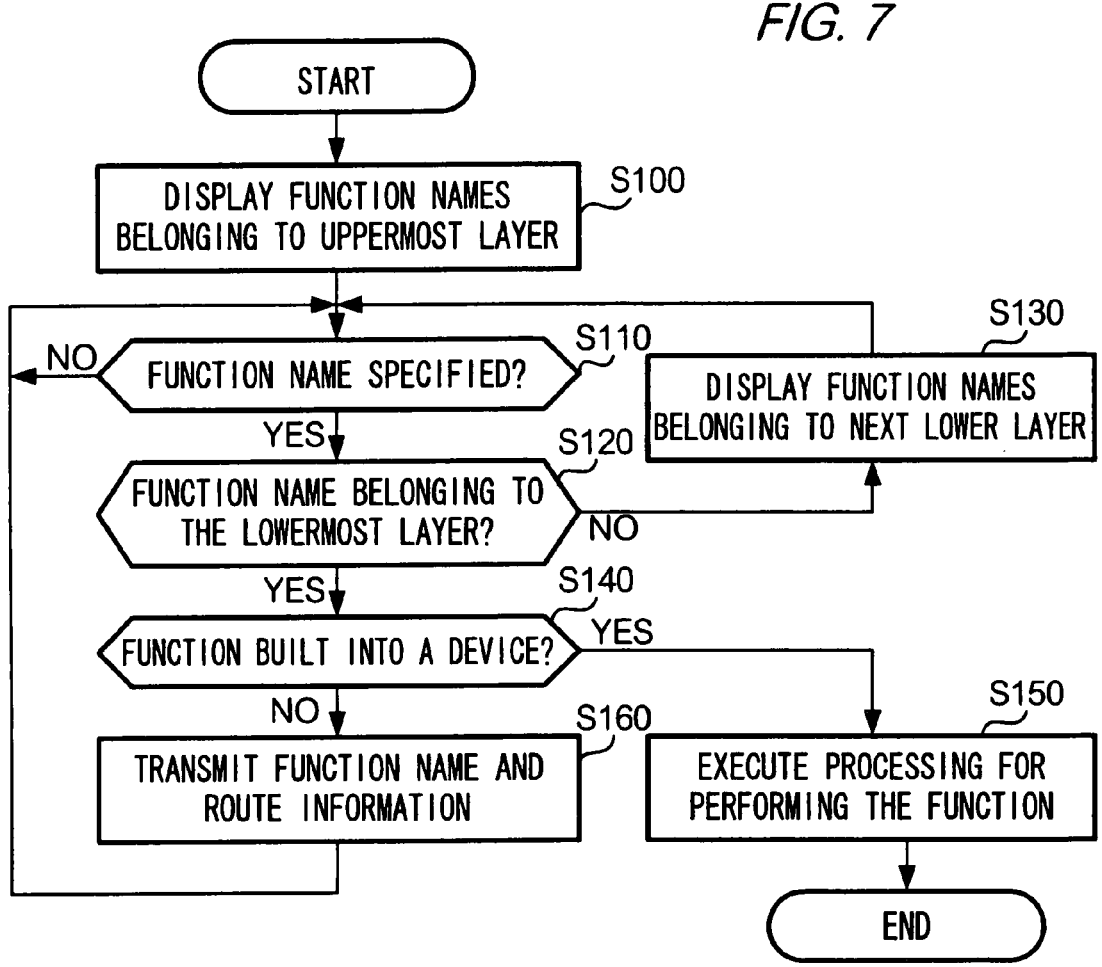
FIG. 7 is a flowchart showing operation of the image forming device 20.

Referring first to FIG. 7, description will be first made of an operation of transmitting a function name 27b assigned to a function desired by a user to the information collection device 10. While waiting for input of an instruction from the user, the controller 21 of the image forming device 20 causes the display/manipulation unit 23 to display function names 27b which belong to the uppermost layer, among function names 27b stored in the storage unit 27 (step S100). The controller 21 then stands by until the user manipulates the display/manipulation unit 23 to specify any of the displayed function names 27b (step S110). For example, the display/manipulation unit 23 displays function names 27b such as "suppress output sheets" and "output fine photos", which belong to the uppermost layer. If the function name 27b "suppress output sheets" is selected from among the displayed function names 27b (step S110: YES), the controller 21 causes the RAM to store the function name 27b "suppress output sheets". Further, the controller 21 determines whether the function name 27b "suppress output sheets" belongs to the lowermost layer or not (step S120). Since the function name 27b "suppress output sheets" is not a function name belonging to the lowermost layer (step S120: NO), the controller 21 reads, from the storage unit 27, function names 27b which belong to a next lower layer, immediately subordinate to the function name 27b "suppress output sheets". In this example, function names 27b "output all" and "output partially" are read from the storage unit 27. Further, the controller 21 causes the display/manipulation unit 23 to display the read function names 27b (step S130). The controller 21 then returns to the processing of step S110 and stands by until any of the displayed function names 27b is specified next.

Figure 8:
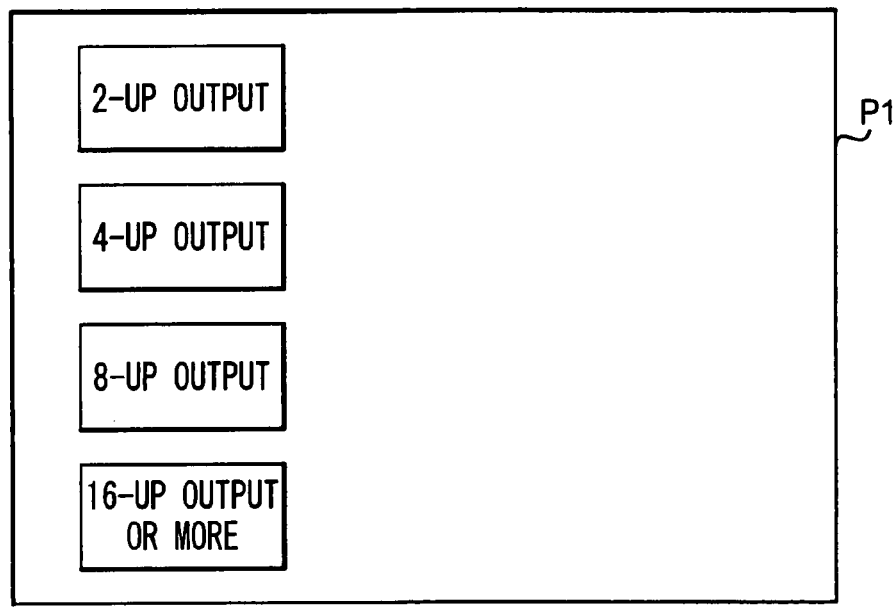
FIG. 8 shows an example of a screen displayed by the display/manipulation unit 23.
Figure 9:
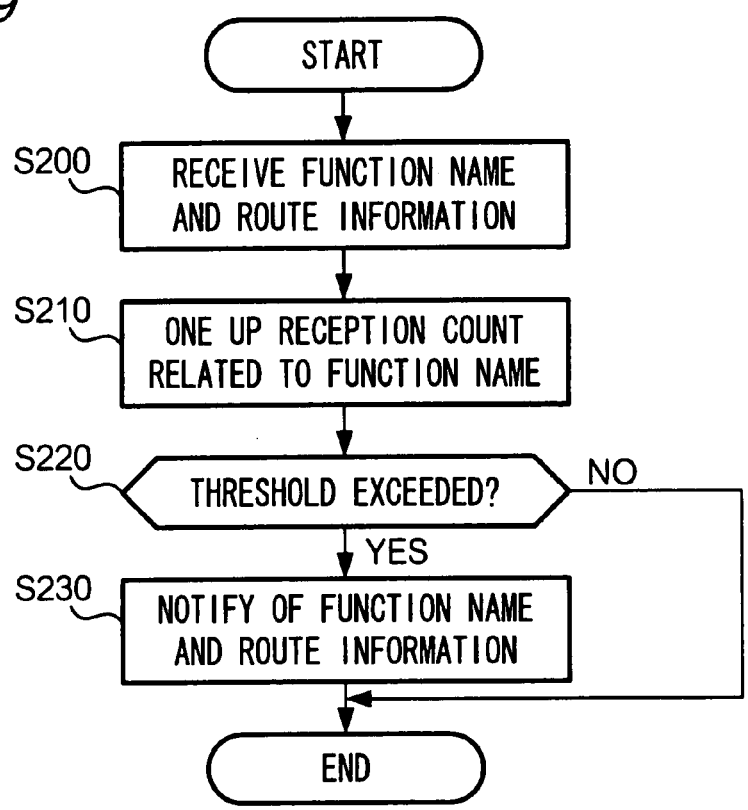
FIG. 9 is a flowchart showing notification operation of the information collection device 10.

In this manner, the processing of steps S110 to S130 are repeated, and function names 27b stored in the storage unit 27 are thereby displayed hierarchically on the display/manipulation unit 23, to accept selection of any of the displayed function names 27b in each of the hierarchical layers. Now it is supposed that a case where the function names 27b "suppress output sheets", "output all", and "n-up" shown in FIG. 3 are sequentially specified respectively, in hierarchical layers. In this case, a group of these specified function names 27b is stored into the RAM as a route information item to the function name 27b belonging to the lowest one of these layers. Further, function names 27b which belong to an even lower layer are subordinate to the function name 27b "n-up" which was specified last. FIG. 8 shows an example of a screen P1 displayed on the display/manipulation unit at this time. As shown in the figure, function names 27b "2-up output", "4-up output", "8-up output", and "16-output or more" are provided on the screen P1. In the figure, "2-up output", "4-up output", and "8-up output" are function names 27b assigned to functions built into the image forming device 20. On the other side, "16-up output or more" in the figure is a function name 27b assigned to a function not built into the image forming device 20. These function names 27b are displayed, for example, as buttons in a state capable of accepting an execution instruction. In the figure, "2-up output", "4-up output", "8-up output", and "16-output or more" are displayed so as to show visually equal appearances. For example, in case of displaying these function names 27b as buttons, the buttons for "2-up output", "4-up output", and "8-up output", and the button for "16-output or more" are all formed to have the same color, density, and shape as each other.

If the display/manipulation unit 23 is manipulated by the user to specify, for example, "2-up output" on the screen P1 shown in FIG. 8 (step S110:YES), the controller 21 causes the RAM to store the function name 27b "2-up output". The controller 21 further determines whether the function name 27b "2-up output" belongs to the lowermost layer (step S120). Since the function name 27b "2-up output" belongs to the lowermost layer (step S120: YES) in this example, the controller 21 further determines whether a function, to which "2-up output" is assigned, is built into the image forming device 20 or not, based on a flag given to "2-up output" (step S140). In this example, the function to which "2-up output" is assigned is built into the image forming device 20 (step S140: YES). Therefore, the controller 21 executes a processing for performing the function "2-up output" by use of the image forming device 20, e.g., the image forming device 20 is caused to execute a function of forming images of two pages together onto one page (step S150).

Otherwise, if the display/manipulation unit 23 is manipulated by the user to specify, for example, "16-output or more" on the screen P1 shown in FIG. 8 (step S110: YES), the controller 21 causes the RAM to store the function name 27b "16-output or more". Further, the controller 21 determines whether the function name 27b "16-output or more" belongs to the lowermost layer (step S120). Since the function name 27b "16-up output" belongs to the lowermost layer (step S120: YES) in this example, the controller 21 further determines whether a function to which is assigned "16-up output" is built into the image forming device 20 or not, based on a flag given to "16-output or more" (step S140). In this example, a function to which is assigned "16-up output" is not built into the image forming device 20 (step S140: NO). Therefore, the controller 21 reads a function name 27b and a route information item which are stored in the RAM. The read function name 27b is "16-output or more", and the read route information item indicates a group of function names 27b "suppress output sheets", "output all", and "n-up". Further, the controller 21 controls the communication unit 22 to transmit the read function name 27b and the route information item to the information collection device 10 (step S160). The controller 21 then repeats processings from the step S110.

2-2. Notification Operation of Information Collection Device 10

Next, a description will be made of an operation of notifying a function name 27b which is frequently desired by users.

Each time a function name 27b and a related route information item are transmitted from any of the image forming devices 20 in a manner described above, the communication unit 12 of the information collection device 10 receives the transmitted function name 27b and the route information item (step S200). The controller 11 specifies a reception count related to the received function name 27b, referring to the collected information 17b shown in FIG. 6, and counts one up from the value of the reception count (step S210). For example, if "16-output or more" as a function name 27b and "suppress output sheets", "output all", and "n-up" as the route information item are transmitted from an image forming device 20, the controller 11 counts one up the reception count "99" related to "16-output or more" in the collected information 17b shown in the figure. Further, the controller 11 determines whether the reception count counted one up exceeds a threshold or not (step S220). If the reception count does not exceed the threshold (step S220: NO), it is considered that the function to which is assigned the function name 27b related to the reception count has not been desired so frequently as to be notified to the developer. The controller 11 terminates the processing of notification operation without notifying the function name 27b. Otherwise, if the reception count exceeds the threshold (step S220: YES), it is considered that the function assigned with the function name 27b related to the reception count has been desired frequently by users. The controller 11 then causes the display unit 13 to display the function name 27b and the route information item which are related to the reception count, and issues a notification (step S230). For example, in case of supposing "99" as the threshold, the reception count "100" which is one count more, is determined to exceed the threshold "99" in the step S220. Therefore, the display unit 13 displays the function name 27b "16-output or more" and the route information item indicating "suppress output sheets", "output all", and "n-up", which are related to the reception count.

2-3. Operation of Distributing Software Program 27a

Figure 10:
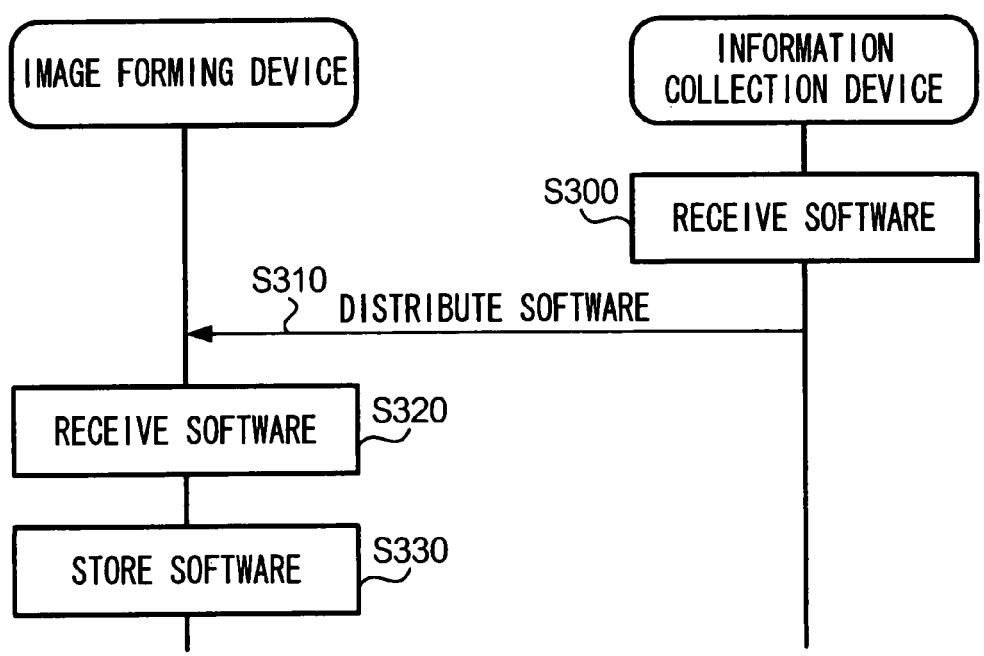

When a function name assigned to a function which has been frequently desired by users is notified to the developer, the software program 27a for performing the frequently desired function is developed with higher priority than that for other functions. The developed software program 27a is stored into a software storage device not shown, and distributed to the information collection device 10 each time the software program 27a is newly developed. Next, operation of distributing a developed software program 27a to the image forming devices 20 will be described referring to FIG. 10.

A developed software program 27a which is transmitted from the software storage device not shown is received by the data input unit 15 of the information collection device 10 (step S300). The controller 11 then controls the communication unit 12 so as to distribute the received software program 27a to each of the image forming devices 20 connected via a network (step S310). The communication unit 22 in each image forming device 20 receives the software program 27a distributed by the information collection device 10 (step S320). Further, the controller 21 causes the storage unit 27 to store the received software program 27a (step S330), and causes the display/manipulation unit 23 to display a message indicative of this additionally stored software program 27a.

2-4. Update of Function Name 27b

Described next will be a processing for changing a function name 27b stored in the storage unit 27. For example, there is a case of adding a function name 27b "make skin whiter" which is subordinate to a function name 27b "output a fine face close-up" to the function names 27b shown in FIG. 4. In this case, the developer manipulates the manipulation unit 14 to input the function name 27b "make skin whiter". The controller 11 of the information collection device 10 controls the communication unit 22 to transmit the input function name 27b "make skin whiter" to the image forming devices 20. In each image forming device 20, the controller 21 causes the storage unit 27 to store the function name 27b "make skin whiter" transmitted by the information collection device 10, as a function name 27b subordinate to the function name 27b "output a fine close-up view of a face". Thereafter, when the function name 27b "output a fine close-up view of a face" is specified, the controller 21 then causes the display/manipulation unit 23 to display related function names 27b including the function name 27b "make skin whiter".

The embodiment described above has a configuration in that the controller 11 causes the display unit 13 to display a function name 27b and a route information item, which are related to a reception count. Due to this configuration, the developer can visually check the function name 27b and route information item displayed by the display unit 13. The developer can hence understand what functions are frequently desired by users, and can further estimate potential users' needs.

There has been described another configuration where the storage unit 27 is caused to store a function name 27b (e.g., "make skin whiter" in the above embodiment) transmitted by the information collection device 10, and the display/manipulation unit 23 is caused to display this stored function name 27b when a function name 27b belonging to an upper layer to which the stored function name 27b is subordinate, is specified. Due to this configuration, it is possible to check a degree of how much a function specified by a function name 27b sent from the developer is desired.

3. Modifications

The embodiment as has been specifically described above can be modified as follows.

The above embodiment refers to an example of utilizing image forming devices 20 each, as an information processing device. However, the invention is not limited to the example but the information processing device can be any device that can execute any processing. For example, the information processing devices can be audio devices such as a personal computer, CD (Compact Disc) player, and portable audio player, cellular phones, or various home electronic devices.

In the above embodiment, operation of transmitting a function name 27b assigned to a function desired by a user is carried out by the controller 21, communication unit 22, and storage unit 27 included in the image forming device 20. However, the invention can be considered also as a function selection device constituted by the controller 21, communication unit 22, and storage unit 27. Such a function selection device including the controller 21, communication unit 22, and storage unit 27 has: a storage unit that stores function identifiers (as identification information) of a first type assigned to functions built into an information processing device having a different structure from the function selection device, and function identifiers of a second type assigned to functions not built into the information processing device; a display controller that causes a display unit to display the function identifiers of both types stored in the storage unit; a manipulation unit that accepts manipulation of specifying any of the function identifiers displayed by the display controller; and an output unit that outputs the function identifier specified by the manipulation, to the information processing device.

In the above embodiment, the controller 21 of the image forming device 20 is configured to transmit a function name 27b and a route information item to the information collection device 10. The invention is not limited to this configuration but the controller 21 can be configured to transmit a function name 27b and only a part of a route information item. Though the embodiment utilizes function names 27b as function identifiers, the function identifiers are not limited to function names 27b but can be described by any type of information capable of identifying each function, e.g., character strings or codes respectively assigned to functions.

In the processing for updating a function name 27b in the above embodiment, function names 27b stored in the storage unit 27 can be deleted. For example, the controller 21 of the image forming device 20 can delete a function name 27b from the storage unit 27 after transmitting the function name 27b to the information collection device 10. Then, the function name 27b transmitted to the information collection device 10 is not displayed any more by the display/manipulation unit 23.

Further, the controller 21 of each image forming device 20 can be configured so as to perform user authentication each time a user uses an image forming device 20. Particularly when a user who has transmitted a particular function name 27b to the information collection device 10 uses an image forming device 20, the function name 27b transmitted by the user can be inhibited from being displayed by the display/manipulation unit 23. There are two methods for such user authentication. One method utilizes user IDs (user identifiers) and passwords for identifying respective users. The controller 21 causes the storage unit 27 to store the user IDs and plural groups of function names 27b, with the user IDs and plural groups related to each other. When a specified function name 27b is transmitted to the information collection device 10 assigned to a particular user, in accordance with a manipulation by a user, the controller 21 then deletes the transmitted specified function name 27b from the group of function names 27b related to the particular user ID. As a consequence, when the same user utilizes an image forming device 20 next or later, the function name 27b which has already been transmitted will not be displayed by the display/manipulation unit 23.

In the above embodiment, a developed software program 27a is distributed to all image forming devices 20 connected via a network. However, the developed software program 27a can be distributed only to particular one or ones of the image forming devices 20. For example, when the communication unit 12 of the information collection device 10 receives a function name 27b and a route information item from an image forming device 20, the communication unit 12 receives at the same time a communication address assigned to the image forming device 20, as indicating a source which has transmitted the function name 27b and the route information item. The controller 11 specifies the received function name 27b in the collected information 17b shown in FIG. 6, and causes the communication address to be stored related to the function name 27b. In this manner, communication addresses of all the image forming devices 20 which have transmitted the function name 27b are received. Furthermore, each time a newly developed software program 27a is transmitted from the software storage device, the controller 11 specifies a function name 27b of a function which is performed by the software program 27a, from the collection information 17b. The controller 11 then distributes the software program 27a to image forming devices 20 to which are assigned communication addresses which are stored in relation to the specified function name 27b.

The controller 11 can further inquire of the image forming devices 20 to which are assigned the communication addresses stored and related to the specified function name 27b, about whether a software program 27a should be distributed or not. In response to such an inquiry, the controller 21 of each of the image forming devices 20 causes the display/manipulation unit 23 to display, for example, a message saying "software named xxx has been developed. Do you need distribution of it?" or so. If a user sees the message and manipulates to request distribution of the software, the controller 21 of a corresponding image forming device 20 transmits a distribution request for distribution of the software program 27a, to the information collection device 10. In response to the distribution request, the controller 11 of the information collection device 10 distributes the software program 27a to the image forming device 20.

In the above embodiment, the controller 21 of the image forming device 20 can be configured to accept a selection of either a method for displaying the function names 27b in a manner as described above or a standard method for displaying only function names of functions built into the image forming device 20. The controller 21 can cause function names 27b to be displayed in accordance with the selected display method.

In the above embodiment, the controller 21 can cause the display/manipulation unit 23 to display a message (as text information) such as "excuse me, a corresponding function is not built into this image forming device" when "16-up output or more" is specified on the screen P1 shown in FIG. 8.

In the above embodiment, the controller 11 of the information collection device 10 issues a notification to the developer by causing the display unit 13 to display (output) the function name 27b "16-up output or more". In place of this manner of issuing notification, the controller 11 can generate an e-mail including the function name 27b "16-up output or more", and transmit (output) the e-mail to an electronic mail address assigned to a terminal device which the developer uses. In this manner, the developer can be notified of function names 27b frequently desired by users and related route information items unless the developer especially checks the display unit 13 of the information collection device 10.

In the above embodiment, the controller 21 transmits a function name 27b and related route information to the information collection device 10. In this respect, the controller 21 can be configured so that information expressing a specified function is transmitted when the display/manipulation unit 23 is manipulated. In other words, information to be transmitted to the information collection device 10 need not always be information displayed on the display/manipulation unit 23. In this case, for example, the storage unit 17 of the information collection device 10 stores information items expressing functions which are not built into each image forming device 20 but can be specified by users, and the collected information 17b including reception counts related to the functions. When the communication unit 12 receives an information item expressing a function specified by manipulation of a user, the controller 11 then notifies of the function specified by the manipulation of the user if a threshold is exceeded by the reception count related to the received information item expressing the function specified by the manipulation of the user.

Software (program) describing procedures executed by the controller 21 of the image forming device 20 and by the controller 11 of the information collection device 10 in the above embodiment can be provided as a recording medium which records the software. Examples of the recording medium are a magnetic tape, magnetic disk, flexible disk, optical recording medium, magneto-optical recording medium, CD (Compact Disk), DVD (Digital Versatile Disk), RAM, etc. Further, various devices can be allowed to download the software (program) via a network such as the internet.

What is claimed is:

1. An information processing device comprising:
a memory that stores function identifiers assigned to functions built into the information processing device, and function identifiers assigned to functions not built into the information processing device;
a display controller that causes a display unit to display the function identifiers stored in the memory;
a manipulation unit that accepts manipulation for specifying one of the function identifiers displayed by the display controller; and
a transmission unit that transmits, if the one of the function identifiers which has been specified by the manipulation is assigned to one of the functions not built into the information processing device, the specified one of the information identifiers or an information item indicating one of the functions to which is assigned one of the information identifiers which has been specified by the manipulation, to a predetermined device, wherein
the functions are related to each other, classified hierarchically in uppermost to lowermost layers;
the display controller causes the display unit to hierarchically display the function identifiers stored in the memory;
the manipulation unit accepts manipulation of specifying one of the function identifiers displayed by the display controller, in each of the layers;
if one of the function identifiers specified in the lowermost layer is assigned to one of the functions not built into the information processing device, the transmission unit transmits, to the predetermined device, the specified one of the function identifiers or an information item indicating one of the functions which is assigned to the specified one of the function identifiers, and other ones of the function identifiers, which have been specified respectively in upper layers other than the lowermost layer, in a course of reaching the lowermost layer.

2. An information processing device comprising:
a memory that stores function identifiers assigned to functions built into the information processing device, and function identifiers assigned to functions not built into the information processing device;
a display controller that causes a display unit to display the function identifiers stored in the memory;
a manipulation unit that accepts manipulation for specifying one of the function identifiers displayed by the display controller; and
a transmission unit that transmits, if the one of the function identifiers which has been specified by the manipulation is assigned to one of the functions not built into the information processing device, the specified one of the information identifiers or an information item indicating one of the functions to which is assigned one of the information identifiers which has been specified by the manipulation, to a predetermined device,
wherein the display controller inhibits the display unit from displaying the specified one of the information identifiers which has been transmitted by the transmission unit, among the function identifiers stored in the memory.

3. The information processing device according to claim 2, wherein if one of the function identifiers assigned to the functions not built into the information processing device is specified among the function identifiers stored in the memory, the display controller causes the display unit to display text information indicating that one of the functions to which is assigned the specified one of the function identifiers is not built into the information processing device.

4. The information processing device according to claim 2, further comprising an identification unit that identifies a user who manipulates the manipulation unit, wherein
the memory stores an identifier assigned to the user identified by the identification unit, and the function identifier specified by the manipulation, with the identifier and the function identifier related to each other, and
the display controller inhibits the display unit from displaying the function identifier stored in relation to the identifier assigned to the user identified by the identification unit.

5. The information processing device according to claim 2, further comprising a reception unit that receives the function identifiers assigned to the functions not built into the information processing device, from a predetermined device, wherein
the memory stores the function identifiers received by the reception unit, as the function identifiers assigned to the functions not built into the information processing device.

6. The information processing device according to claim 2 wherein the display controller displays the function identifiers assigned to the functions built into the information processing device, and the function identifiers assigned to the functions not built into the information processing device, allowing an execution instruction to be given to any of the function identifiers displayed.

7. An information collection device comprising:
a reception unit that receives one of the function identifiers assigned to functions not built into an information processing device or information items indicating the functions not built into the device;
a memory that stores the one of the function identifiers assigned to the functions not built into or the information items indicating the function not built into the information storing device, which has been received by the reception unit, with the received one of the function identifiers or information items related to a reception count indicating the number of times the received one of the function identifiers or the information items has been received; and
a notification unit that issues notification information indicating one of the function identifiers or information items, which is related to a reception count exceeding a threshold, among the function identifiers or information items indicating the functions not built into the information processing device, which are stored in the memory.

8. The information collection device according to claim 7, further comprising a distribution unit that distributes, to the information processing device, a software program for performing the functions to which is assigned one of the function identifiers, which is related to the reception count exceeding the threshold.

9. The information collection device according to claim 7, wherein
the reception unit receives a device identifier assigned to the information collection device, and one of the function identifiers assigned to the functions not built into the information processing device or the information items indicating the functions not built into the device, and
the information collection device further comprises a distribution unit that distributes a software program for performing a function to which is assigned or indicated by the received one of the function identifiers or the information items, to the information collection device to which is assigned the device identifier which is stored in the memory, related to the received one of the function identifiers or the information items.

10. The information collection device according to claim 9, wherein
if one of the function identifiers and a software program for performing a function to which is assigned the one of the function identifier are input, the distribution unit inquires of an information processing device to which is assigned a device identifier which is stored in the memory, related to the one of the function identifiers, about whether distribution of the software program is required or not, and
as an inquiry result, if the distribution of the software program is required, the distribution unit distributes the software program.

11. An information collection system comprising:
an information processing device including
a memory that stores function identifiers assigned to functions built into the information processing device, and function identifiers assigned to functions not built into the information processing device,
a display controller that causes a display unit to display the function identifiers stored in the memory,
a manipulation unit that accepts manipulation for specifying any of the function identifiers displayed by the display controller, and
a transmission unit that transmits, if a function identifier specified by the manipulation is assigned to one of the functions not built into the information processing device, the specified information identifier or an information item indicating one of the functions which has been specified by the manipulation, to a predetermined device; and
an information collection device including
a memory that receives the specified function identifier or the information item indicating the one of the functions, which has been transmitted by the transmission unit, and stores the specified function identifier or the information item, related to a reception count indicating the number of times the function identifier or the information item has been received, and
a notification unit that issues notification information indicating one of the function identifiers or information items which are stored in the memory, the one of the function identifier or information item being related to a reception count exceeding a threshold.

12. A method, comprising:
storing function identifiers assigned to functions built into a computer, and function identifiers assigned to functions not built into the computer;
displaying the stored function identifiers;
accepting manipulation for specifying the one of the displayed function identifiers;
transmitting, if the one of the function identifiers which has been specified by the manipulation is assigned to one of the functions not built into the computer, the specified one of the information identifiers or an information item indicating one of the functions to which is assigned the one of the information identifiers which has been specified by the manipulation, to a predetermined device; and
inhibiting from displaying the specified one of the information identifiers which has been transmitted, among the stored function identifiers.

13. A method, comprising:
receiving function identifiers assigned to functions or information items indicating functions which are specified by manipulation of a user;
storing the function identifiers or the information items indicating functions, which have been received by the reception unit, with the received function identifiers or information items related to reception counts respectively, indicating the number of times the function identifiers or the information items have been received; and
issuing notification information indicating one of the function identifiers or information items, which is related to a reception count exceeding a threshold, among the stored function identifiers or information items.

* * * * *